(12) United States Patent
Patrick

(10) Patent No.: US 6,304,175 B1
(45) Date of Patent: Oct. 16, 2001

(54) VEHICULAR TURN SIGNAL ALARM

(76) Inventor: Franklin G. Patrick, P.O. Box 68570, Portland, OR (US) 97268

( * ) Notice: Subject to any disclaimer, the term of this patent is extended or adjusted under 35 U.S.C. 154(b) by 0 days.

(21) Appl. No.: 09/495,544

(22) Filed: Feb. 1, 2000

Related U.S. Application Data

(60) Provisional application No. 60/118,190, filed on Feb. 1, 1999.

(51) Int. Cl.[7] .................................................. B60Q 1/34
(52) U.S. Cl. .......................................... 340/475; 340/474
(58) Field of Search ................................ 340/475, 474, 340/457, 326, 815.69; 307/10.8; 200/61.27, 61.38

(56) References Cited

U.S. PATENT DOCUMENTS

| | | | |
|---|---|---|---|
| 3,247,402 | 4/1966 | Hayden | 307/137 |
| 3,343,123 | * 9/1967 | Troesh | 340/384 |
| 4,754,256 | * 6/1988 | Fluhr et al. | 340/75 |
| 4,924,208 | * 5/1990 | Coughlin | 340/474 |
| 5,218,340 | * 6/1993 | Shannon, Jr. et al. | 340/475 |
| 5,309,143 | * 5/1994 | Brown et al. | 340/475 |
| 5,442,332 | * 8/1995 | Hughes | 340/467 |
| 5,523,738 | * 6/1996 | Fuller | 340/475 |
| 5,646,590 | * 7/1997 | Dembicks | 340/475 |
| 5,872,511 | * 2/1999 | Ohkuma | 340/475 |
| 6,091,321 | * 7/2000 | Karell | 340/475 |

* cited by examiner

*Primary Examiner*—John Tweel, Jr.
(74) *Attorney, Agent, or Firm*—Dellett and Walters

(57) ABSTRACT

A vehicle turn signal alarm employs a signal source which is activated to emit an alert signal in response to operation of the turn signal indication system of a vehicle for alerting the vehicle driver that the turn signal indication system is operating.

16 Claims, 6 Drawing Sheets

VEHICULAR TURN SIGNAL ALARM

This application claims benefit of provisional application No. 60/118,190 filed Feb. 1, 1999.

BACKGROUND OF THE INVENTION

The present invention relates generally to vehicle turn signal indication systems, and more particularly to an add-on audible alarm for an existing vehicle turn signal indication system.

Motor vehicles are typically equipped with a turn signal indication system generally including: front and rear, left and right turn signal light indicators; a turn signal actuator mounted on the steering column and a turn signal indication flasher. A conventional vehicle turn signal indication system powered from the vehicle's DC electrical system, is energized in response to movement of the turn signal actuator from its neutral "off" position to its right or left turn position, to send an electrical pulse to flash the corresponding turn signal indicators. The turn signal actuator is mechanically coupled to the vehicle steering mechanism in such a way that return of the steering wheel to the straight ahead position following completion of a turn, resets the turn signal actuator to its "off" position. The steering wheel must be rotated through at least a substantial turning angle from its straight-ahead position to effect resetting of the turn signal actuator to the neutral position during subsequent return of the steering wheel to its straight-ahead position following completion of a turn. This is to prevent small movements of the steering wheel during an approach to a turn from prematurely resetting the turn signal actuator. The minimum turning angle of the steering wheel from its straight-ahead position, necessary to effect resetting of the turn signal actuator, is referred to herein as the "turn signal cancel angle".

Conventional systems have a problem in that if a right or left turn is executed by rotation of the steering wheel through an angle less than the turn signal cancel angle, return of the steering wheel to the straight ahead position following completion of the turn will not reset the turn signal actuator. Unless the driver remembers to reset the turn signal actuator to its neutral position, the turn signal indicators will continue to flash, presenting a safety hazard, as the driver may be wrongly signaling fellow motorists.

Solutions to the turn signal problem have been devised, wherein an audible turn signal alarm alerts the driver to manually cancel the turn signal. In one solution, the audible alarm is activated after a preset time lapse following actuation of the turn signal indication system. This preset time lapse is greater than the time generally required to complete a turn so that the alarm activates after completion of a turn only if the turn indicators remain operating.

Another solution to the turn signal problem discussed above, provides an audible turn signal alarm that commences immediately upon movement of the turn signal actuator from its neutral position and continues until the actuator is returned to its neutral position, canceling the turn indication.

The problems with the prior art audible turn signal alarm systems lie in physical installation. Existing systems require additional wiring and must be connected to the vehicle's electrical system as well as the vehicle's turn signal indication system. Such installation is often beyond the ability of the vehicle owner, facilitating the additional expense of installation personnel. Also, mounting such systems is cumbersome as the amount of space available to mount the system, which is generally located under the dashboard, is limited.

Because of these drawbacks, audible turn signal alarm systems are rarely installed, or used. Or, if they are installed, after a period of time, a driver will disconnect the alarm, as a result of annoyance.

SUMMARY OF THE INVENTION

According to the present invention a modular turn signal alarm is provided that includes an alarm generator, and sockets or pass through apertures that receive the connector prongs of an existing flasher unit therein. The alarm is thereby powered by the existing vehicle electrical system and generates an alarm, which may be audio or visual, while the turn signal is operational.

Other embodiments include timer operation, wherein the alarm does not activate until a period of time has passed.

It is an object of the invention to provide an improved turn signal alarm to alert the driver of a vehicle that the turn signal indication system is operating.

It is a further object of the invention to provide an improved turn signal alarm that may be installed without any electrical wiring or special adapters yet has all the electrical protection of conventional vehicular electrical circuits.

It is still a further object of the invention to provide an improved turn signal alarm with physical dimensions small enough to fit adjacent to any vehicle's signal flasher unit, and within the confines of the vehicle's under-dash area.

Another object of the present invention is to provide an improved turn signal alarm that is easily installed by motorists without any installation expertise.

It is another object of the present invention to provide an improved turn signal alarm that is low cost to produce.

It is still a further object of the present invention to provide an improved turn signal alarm that functions independently from the vehicle.'s existing turn signal indication system, but makes use of existing circuitry in vehicles which employ a conventional turn signal flasher.

It is a still further object of the present invention to provide an improved modular turn signal alarm that can be easily replaced in case of failure.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
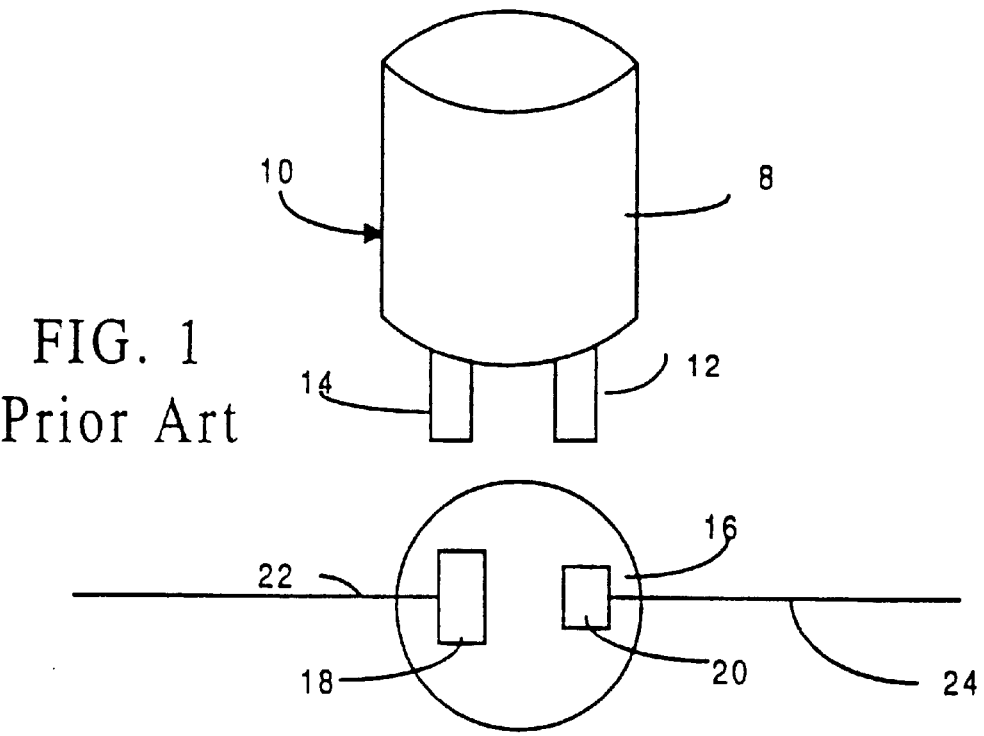
FIG. 1 is a perspective view of a conventional turn signal flasher in its operational environment.

Referring to FIG. 1, a conventional turn signal flasher 10 is illustrated. The turn signal flasher 10 has a housing 8 of any appropriate configuration, typically cylindrical or rectangular, which is open at one end (not illustrated). The turn signal flasher 10 may be constructed of any suitable material, such as an aluminum alloy or plastic. In the case of an aluminum alloy cylinder shaped housing, the open end of the housing 8 is closed by a disk-like base or end plate to which the housing 8 is generally secured by crimping the open end of the housing 8 about the edge of the housing end plate. Protruding through the housing end plate, parallel to the longitudinal axis of the turn indicator flasher housing 8, is a pair of electrical male connector prongs 12 and 14. These electrical prongs may have different physical orientations depending upon the vehicle manufacturer, but are connected inside the turn indicator flasher housing 8 to the electrical terminals of the internal flasher circuit.

In operation, the electrical prongs 12 and 14 engage the vehicle's electrical system, becoming part of the turn signal indication system circuit, by insertion into complementary shaped electrical female connector recesses 18 and 20 in electrical socket 16, which connect to the vehicle turn signal electrical system via wires 24, 22. In a vehicle equipped with a conventional turn signal flasher 10, when the driver positions the turn signal actuator in preparation for a left or right turn, electrical current flows through the electrical socket 16 to electrical male connector prong 12 to the electrical terminal of the flasher electronics located inside the flasher housing 8. The flasher opens and closes (in relatively rapid continuous sequence) the current path between the two electrical male connector prongs 12 and 14. The other electrical male connector prong 14 serves to carry these electrical impulses on to the chosen turn signal indicator lights of the vehicle, thus "flashing" the turn signal indicators of the vehicle.

Figure 2:
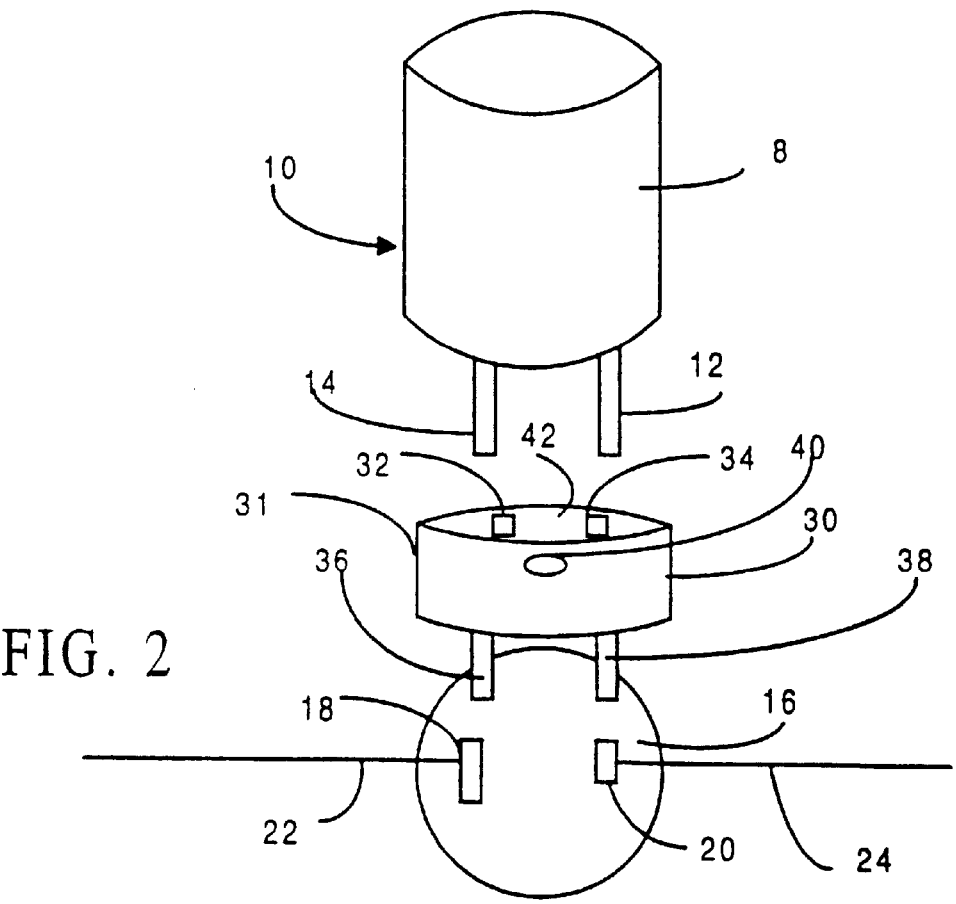
FIG. 2 is an perspective view of the audible vehicle turn signal alarm of the present invention and a conventional turn signal flasher in its operational environment.

Turning now to FIG. 2, one embodiment of the audible turn signal alarm 30 can be seen. This audible turn signal alarm 30 comprises a housing 31 of any appropriate configuration (generally cylindrical as in the illustrated embodiment) that is open at both ends. It may be constructed of any appropriate material, such as an aluminum alloy or plastic. In the case of an aluminum alloy shell, the open ends of the shell are closed by top and bottom disk-like bases or end plates 42 to which the housing 31 is generally secured by crimping the open end of the housing 31 about the edges of the end plates 42. Protruding through the bottom end plate (not shown), parallel to the longitudinal axis of the audible turn signal alarm 30, is a pair of electrical male connection prongs 36 and 38. These electrical prongs 36 and 38 have different physical configurations depending upon the particular vehicle manufacturer and are connected inside the turn signal alarm 30 to the turn signal circuitry and audio signal generator. The audible signal generator source may comprise any suitable small audible signal generator. The audible turn signal alarm housing 31 also defines an orifice 40 that allows the audible alarm sound to permeate into the vehicle's environment.

The operation of a turn signal indication system with an audible turn signal alarm installed, is made possible by the removal of the turn signal flasher's male electrical prongs 12 and 14 from the electrical socket 16 and the insertion of the turn signal flasher's electrical prongs 12 and 14 into the electrical female connector recesses 32 and 34 located in the housing end plate 42 at the top end of the audible turn signal alarm 30. The electrical male connector prongs 36 and 38 of the audible turn signal alarm 30 are then inserted into electrical female connector recesses 18 and 20 of electrical socket 16, thereby engaging the vehicle's electrical system, and become part of the turn signal indication system circuit. This allows for a physical in-line electrical connection between the audible vehicular turn signal alarm 30 and the turn signal flasher 10.

The sequence of events leading up to a turn signal indication proceeds as follows. First, when the driver positions the turn signal actuator in preparation for a left or right turn, electrical current flows through electrical female connector recess 20 of electrical socket 16 to the audible turn signal alarm 30 circuitry, the audio signal generator, and to the circuitry of the signal flasher 10 via electrical male connector prong 12. The flasher apparatus inside the flasher housing 8 in relatively rapid continuous sequence, opens and closes the current path between the two electrical male connector prongs 12 and 14. Electrical male connector prong 14 serves to carry electrical impulses on through to the selected turn signal indicator lights of the vehicle, thus "flashing" the turn signal indicators of the vehicle. At the same time, the turn signal alarm is powered by the turn signal system as a result of the electrical connection thereto, sounding the alarm (or flashing a visual indicator which may comprise a light emitting diode, for example, or vibrating to provide a tactile indication or alarm).

Figure 3:
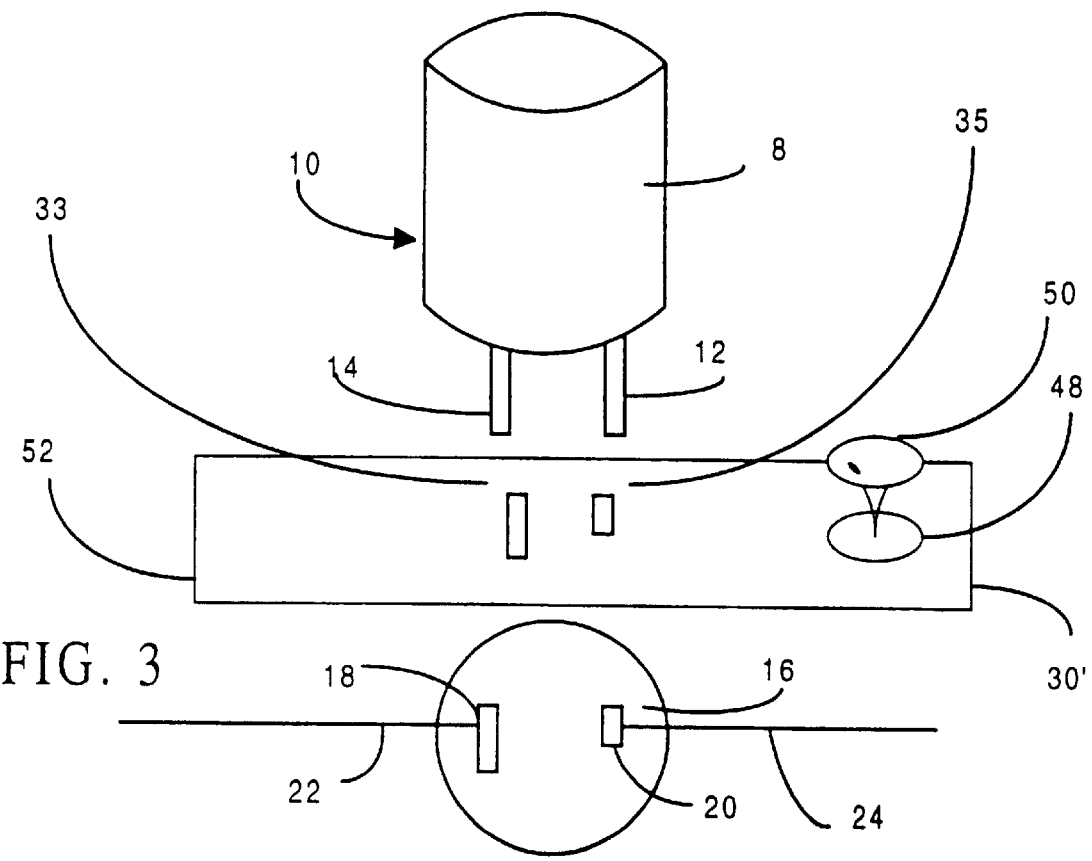
FIG. 3 is a perspective view of the preferred embodiment of the audible vehicle turn signal alarm according to the present invention with a conventional turn signal flasher in its operational environment.

FIG. 3 shows the preferred embodiment of the audible turn signal alarm 30'. To prevent spatial interference with the existing flasher unit and socket (if, for example, there is little vertical space to allow use of the embodiment of FIG. 2), the alarm is constructed with a thin, printed circuit type board with orifices 33 and 35 that match those of the electrical socket 16. In this manner of construction, an audio signal generator 48 (or vibrator or visual indicator) is placed away from the longitudinal axis of the flasher body 8 thereby maintaining spatial clearances. Because of space restrictions, audio signal generator 48 may be small and can employ a hollow cone-shaped horn 50 to direct the emitted sound upwardly, or, with a different orientation, toward a direction more likely to alert the driver. This turn signal alarm 30' comprises a thin circuit board 52 constructed of any appropriate material, such as a synthetic resin or plastic. The board defines apertures 33 and 35 that substantially align with the electrical female connector recesses 18 and 20 of electrical socket 16, allowing the turn signal flasher's male electrical prongs 12 and 14 to be inserted through apertures 33 and 35, and into female connector recesses 18 and 20. In this manner the male electrical prongs 12 and 14 of the flasher engage into the female electrical socket 16, physically passing through the apertures 33 and 35 of the thin circuit board portion of the alarm 30', sandwiching the alarm between the socket and the body of the flasher. The audible signal generator source 48 is located at a location on the circuit board 52 outside of the longitudinal axis of the assembled flasher/alarm unit. Also, an electrical connection to the alarm unit is made via the apertures to prongs 12 and 14 of the existing flasher unit, to provide power to the alarm unit while still enabling connection of the flasher 10 into the existing turn signal electrical system socket. In this manner, no external wiring is required and the turn signal alarm 30' is protected by the same circuit protection device (such as fuses or circuit breakers) as flasher 10. Since in a typical installation, the configuration of the recesses 18 and 20 of electrical socket 16 are not symmetrical or are not mirror images of one another, the alarm 30' can only be oriented in the proper direction during installation.

Figure 4:
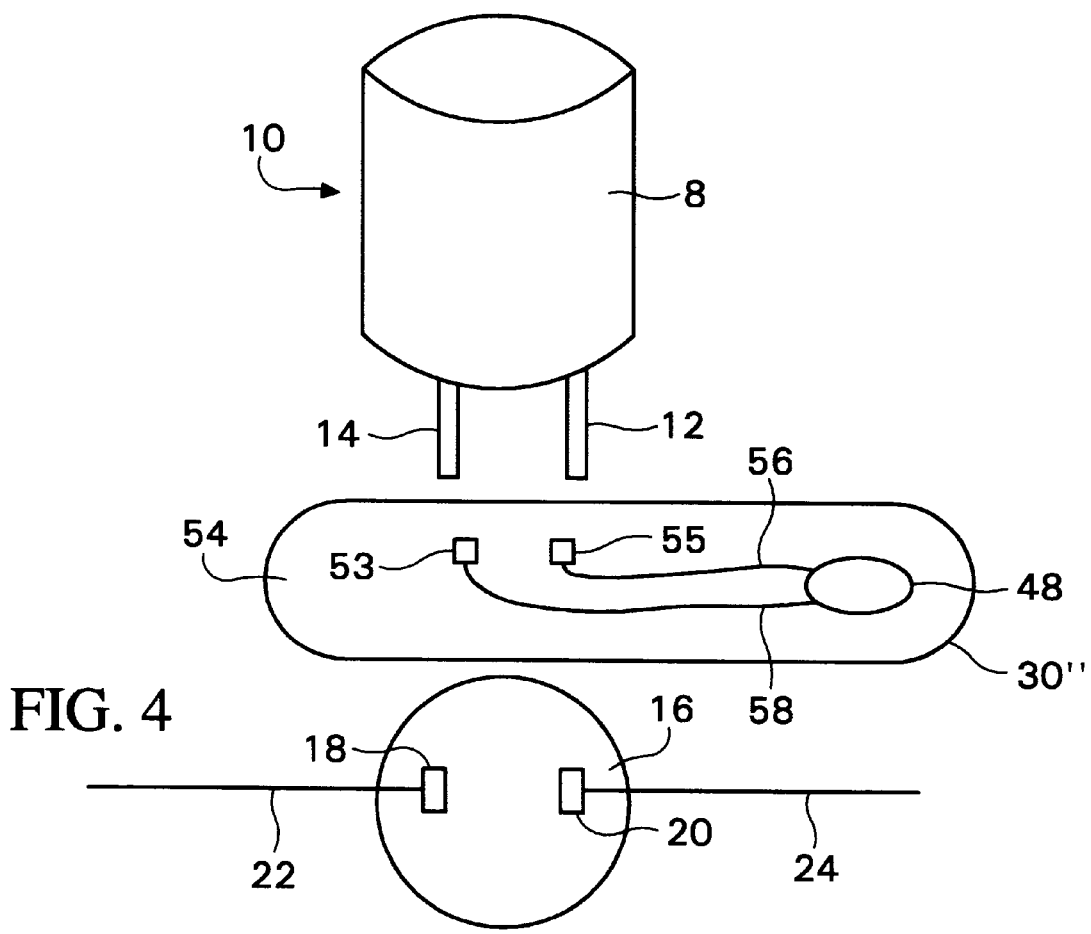
FIG. 4 is a perspective view of an alternate embodiment of the audible vehicle turn signal alarm according to the present invention with a conventional turn signal flasher in its operational environment.

FIG. 4 shows a second alternate embodiment of an audible turn signal alarm 30". Here the alarm employs a thin, non-conductive flexible substrate 54, of any appropriate material such as a plastic or polymer, that defines orifices 53 and 55 that match the electrical female connector recesses 18 and 20 of electrical socket 16, allowing the turn signal flasher's male electrical prongs 12 and 14 to be inserted through apertures 53 and 55, and into female connector recesses 18 and 20. Electrical leads 56 and 58 contact the male electrical prongs 12 and 14 of the turn signal flasher and carry electrical current from the orifices 53 and 55 and the audio signal generator 48.

Operation of this embodiment corresponds to that of the preferred embodiment. The male electrical prongs 12 and 14 of the flasher engage into the female electrical socket 16, physically passing through the apertures 53 and 55 of the flexible substrate portion of the alarm 30", sandwiching the alarm. Thus, power and circuit protection is provided to the alarm unit while still enabling connection of the flasher 10 into the existing turn signal electrical system socket.

In a manner corresponding to the preferred embodiment, audio signal generator 48 is placed away from the longitudinal axis of the flasher body 8. The flexible aspect of the substrate allows for installation in areas with more restrictive spatial clearances than those able to be accommodated by the preferred embodiment. The flexible substrate may suitably be bent so as to position the audio signal generator in any position. The generator may also be secured to the top of the flasher unit body, by glue, hook and loop fasteners, or the like. Audio signal generator 48 may or may not employ a hollow cone-shaped horn as in the preferred embodiment.

In alternate embodiments of the present invention, the type of alarm circuit configuration, series or parallel, for example, may be varied depending on the characteristics of the turn signal indication system. In other embodiments, the audible turn signal alarm is actuated simultaneously with the turn signal indicators or the audible turn signal alarm lags, by a preset time, behind the turn signal indication actuation, in order to allow the driver time to complete the turning maneuver without an audible alarm. These embodiments may incorporate an audio signal generator that has an adjustable volume, tone, or both. The audio signal generator may be also be directionally enhanced by a horn. Still another embodiment encompasses a visual turn signal alarm or even a vibratory alarm, to provide tactile indication of the alarm's operation.

Still further, another embodiment of the alarm employs a microprocessor, such as a PIC microcontroller, to provide additional features. One such feature is to increase the alarm volume over time, such that, while initially, a driver may not notice the alarm, due to distraction or excessive road noise, as time goes on and the turn indicator remains activated, the alarm volume is increased. Eventually, it will be difficult to ignore the alarm, alerting the driver to deactivate the turn signal, much to the relief of younger relatives of the driver, following in another vehicle while driving from Portland to Pendleton, Oregon, for example.

Further, a timer delay is suitably provided, either by use of a PIC microcontroller, or by an RC time delay, or other such timer. The timer delay allows a period of time to pass before the alarm is activated, thereby avoiding the alarm if a driver de-activates the turn signal in a reasonable amount of time. This delay is advantageous to only alert the driver at those times when the driver forgets to de-activate the turn signal.

Figure 5:
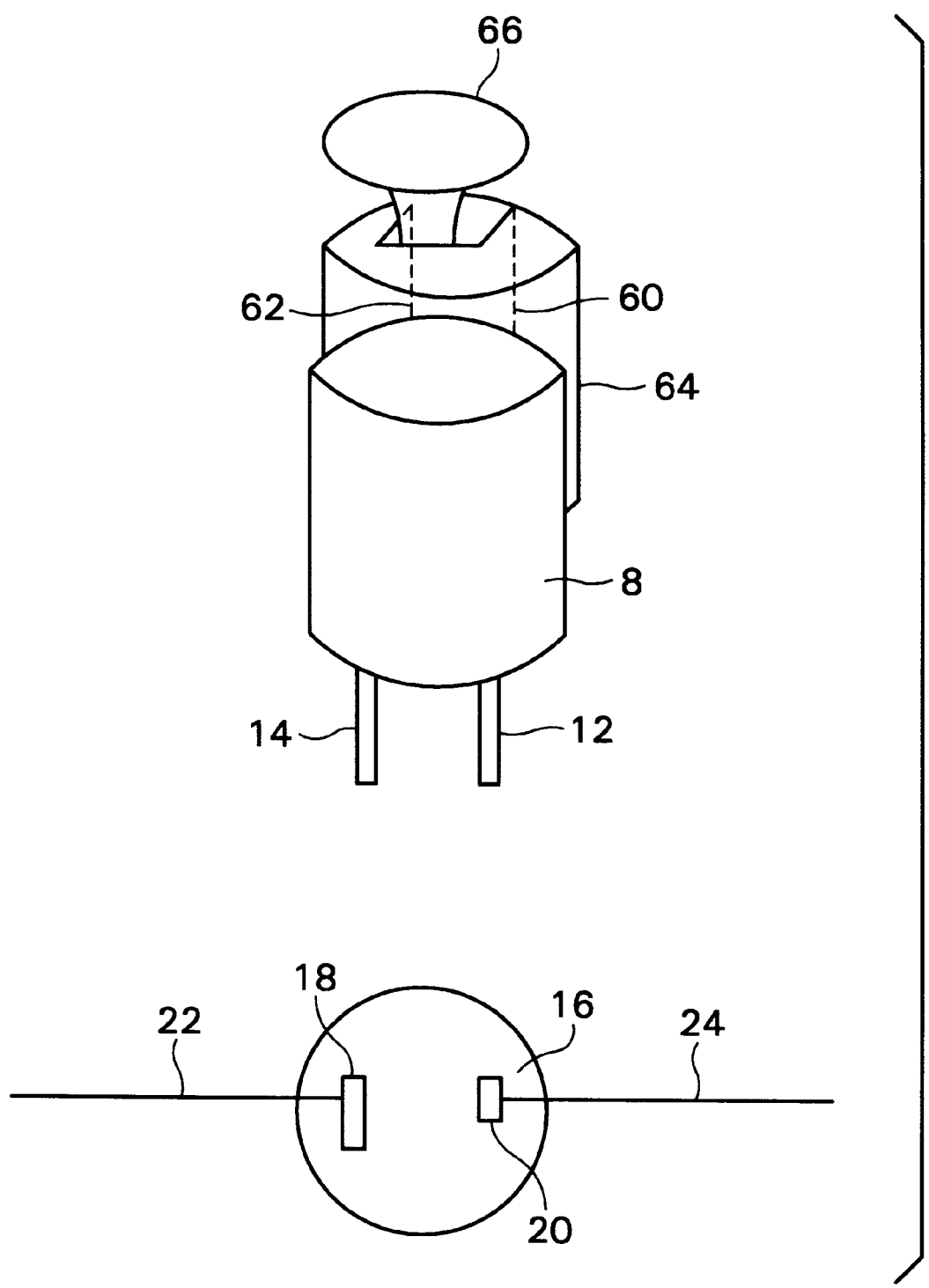
FIG. 5 is a perspective view of another embodiment of the turn signal alarm.

A further embodiment is provided for mounting to the top of the flasher unit, having connecting lead wires that run down the side of the flasher unit body, for engagement with the connection spades at the bottom of the flasher body. Referring to FIG. 5, a perspective view of a top mounting embodiment of the turn signal alarm, lead wires 60, 62 are formed into or onto a substrate 64 that is rigid (or flexible as in the above embodiments), wherein the flasher unit body housing 8 fits within the space defined between the bottom of the connection wires of the alarm and the top of the alarm substrate, which suitably carries the signal generator and a horn 66, for direction of sound or the like towards the driver. The wires 60, 62 extend down the side of the substrate and suitably connect to the flasher electrical supply in a manner corresponding to those discussed hereinabove.

Accordingly, the turn signal alarm in accordance with the invention comprises an independently housed modular audible turn signal alarm circuit and audio, visual, combination of audio/visual or other signal generator. To prevent spatial interferences, the audible turn signal alarm is generally of a planar circuit board construction that is compatible with the electrical connectors found in conventional vehicular turn signal indication systems.

Installation of the audible turn signal alarm is accomplished through the following steps:

unplugging the existing turn signal flasher unit from its electrical socket;

aligning and inserting the turn signal flasher unit through the orifices of the turn signal alarm module according to the invention; and reinserting this combination into the same electrical socket.

In the alternate embodiments, the turn signal alarm is constructed in a closed cylindrical or block shape which houses the alarm circuitry and audio signal generator (or visual indicator). The closed cylinder or block has a male electrical connector at one end, and a female electrical connector in the end distal from the end with the male electrical connector. The audible turn signal alarm connectors are compatible with electrical connectors found in conventional vehicular turn signal indication systems.

Installation of the cylindrical or block shaped embodiment of the turn signal alarm is accomplished through the following three steps:

unplugging the existing turn signal flasher from its electrical socket;

plugging in the turn signal alarm of the invention into the same electrical socket; and plugging the turn signal flasher into the electrical socket provided on the turn signal alarm of the invention.

The actual alarm is generated by an audible signal generator (or light emitting diode, for example) mounted on the turn signal alarm housing. The audible signal generator has an adjustable tone or an adjustable volume, or both.

Figure 6:
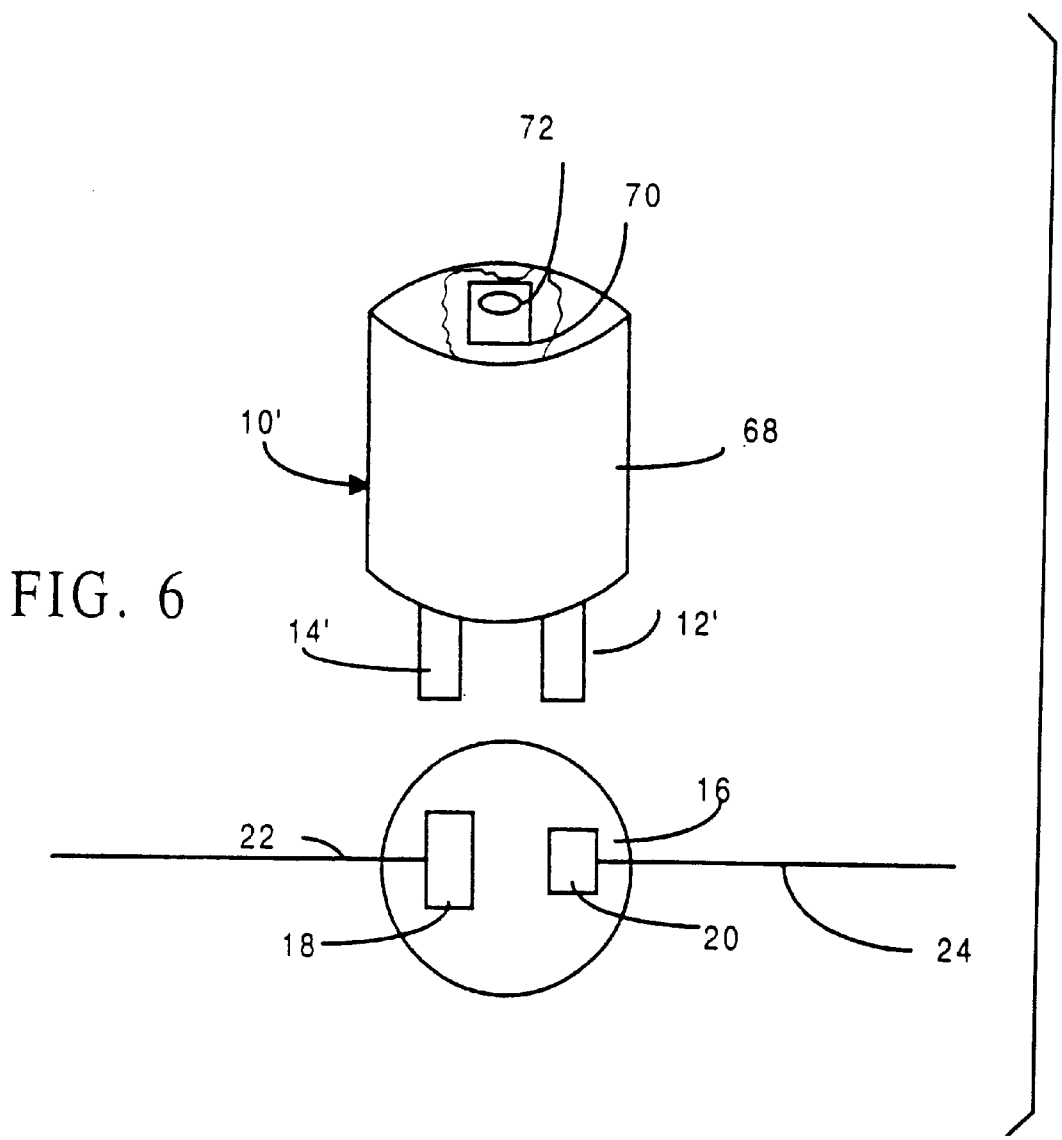
FIG. 6 is a view of an embodiment of the turn signal alarm incorporated into the flasher unit, with a portion of the flasher body cut away to view the alarm therein.
Figure 7:
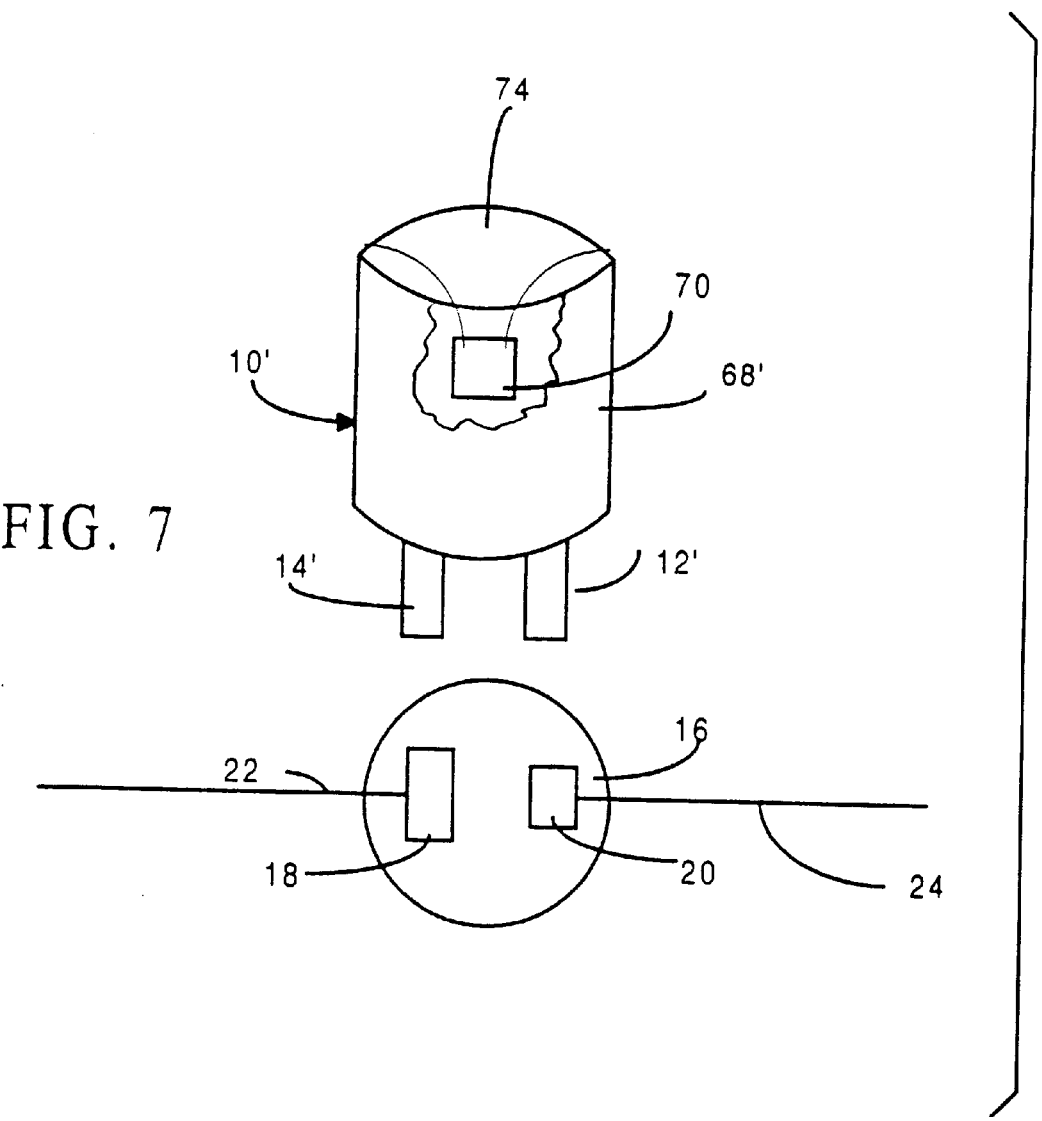
FIG. 7 is a view of an embodiment of the turn signal alarm incorporated into the flasher unit, with an integral horn formed therein, a portion of the flasher body being cut away to view the alarm therein.

In yet another embodiment, as illustrated in FIG. 6, the alarm is incorporated into the flasher unit itself, wherein the flasher 68 comprises a typical structure therein for causing the flashing function, but further includes an alarm generator 70 as an integral portion thereof, contained within the the body of flasher 68. Some manner of allowing the alarm (e.g.

sound) to be conveyed out of the body of the flasher unit is provided, such as an opening 72 as illustrated in FIG. 6. A horn such as horn 66 (FIG. 5) may also be provided if desired, extending from the upper portion of the flasher unit 68. Referring to FIG. 7, a further embodiment employs a horn 74 which is integrally formed as a part of the body of the flasher unit 68'. The horn receives the audible output of alarm 70.

Still further embodiments may include several selectable pre-set volume levels, to tailor the loudness (or brightness/intensity/etc.) to the particular hearing sensitivity of an individual user or to completely disable the warning as desired.

In either the preferred or alternate embodiments, both the turn signal flasher and the turn signal alarm are electrically connected to the turn signal indication system of the motor vehicle, and movement of the vehicle turn signal actuator to either its right or left turn position energizes the turn signal indicators and energizes the audible signal alarm to generate an audible turn signal alarm for alerting the driver to the fact that the turn indication system is operating. This design allows the audible turn signal alarm to share the same circuit protection as the turn indication system.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A vehicle turn signal alert apparatus comprising:

an alert signal generating module adapted to electrically connect to a vehicle flasher socket; and a socket for receiving an existing vehicle turn signal flasher therein, whereby an alert signal is provided to indicate operation of the vehicle turn signal while retaining use and operation of an existing vehicle turn signal flasher, wherein said alert signal generating module comprises a flexible substrate that defines at least one orifice that allows a connection between the vehicle's flasher socket and the turn signal flasher by insertion of a male electrical connector of the turn flasher through the said orifice into the flasher socket.

2. The vehicle turn signal alert apparatus according to claim 1 wherein said alert signal generating module comprises a generally planar board.

3. The vehicle turn signal alert apparatus according to claim 2 wherein the alert apparatus's planar board defines at least one orifice that allows a connection between the vehicle's flasher socket and the turn signal flasher by insertion of a male electrical connector of the turn flasher through the said orifice into the flasher socket.

4. The vehicle turn signal alert apparatus according to claim 1 further comprising a timer for delaying activation of the alert signal until a preset lapse of time after the initial actuation of the vehicle turn signal, to allow time for the completion of a normal turn.

5. The vehicle turn signal alert apparatus according to claim 1 wherein said alert apparatus provides an alert signal to the driver that continues throughout the entire operating period of the turn signal.

6. The vehicle turn signal alert apparatus according to claim 1 wherein the alert signal is an audio signal and further comprising a housing that contains the alert apparatus wherein said housing comprises a side wall that defines a hole that allows the alert signal generated within the alert turn signal apparatus to escape.

7. The vehicle turn signal alert apparatus according to claim 1 wherein the alert apparatus has an alarm intensity adjustment.

8. The vehicle turn signal alert apparatus according to claim 1 wherein the alert apparatus has an adjustment for altering alarm signal characteristics.

9. The vehicle turn signal alert apparatus according to claim 1 wherein the alert apparatus further comprises a male electrical connector and a female socket where connection between a flasher socket of the vehicle and the turn signal flasher unit is accomplished by insertion of the alert apparatus's male electrical connector into the flasher socket and the turn flasher's electrical connector into the female socket of the turn signal alert apparatus.

10. The vehicle turn signal alert apparatus according to claim 1 wherein the alert signal generating module generates an audible alarm.

11. The vehicle turn signal alert apparatus according to claim 10 further comprising a volume adjuster for enabling adjustment of the volume of the audible alarm.

12. The vehicle turn signal alert apparatus according to claim 10 further comprising a tone adjuster for enabling adjustment of frequency characteristics of the audible alarm.

13. The vehicle turn signal alert apparatus according to claim 1 wherein the alert signal generating module generates a visual alarm.

14. The vehicle turn signal alert apparatus according to claim 1 wherein the alert signal generating module generates a tactile alarm.

15. The vehicle turn signal alert apparatus according to claim 6 wherein the alert signal generated within the alert turn signal apparatus is directionally enhanced by a cone-shaped horn placed around said hole.

16. The vehicle turn signal alert apparatus according to claim 1 wherein said flexible substrate is made of a non-conducting plastic or polymer with electrical leads adapted to surround at least one said orifice and provide electrical continuity between the vehicle's flasher socket and an alert signal generating device distally located on said flexible substrate of said turn signal apparatus.

* * * * *